US012215302B1

(12) United States Patent
Nathan

(10) Patent No.: US 12,215,302 B1
(45) Date of Patent: Feb. 4, 2025

(54) SMECTITE CLAY-BASED FABRIC SOFTENER COMPOSITIONS WITH ETHERAMINE STABILIZERS

(71) Applicant: Bala Nathan, Wheaton, IL (US)

(72) Inventor: Bala Nathan, Wheaton, IL (US)

(73) Assignee: Bala Nathan, Wheaton, IL (US)

( * ) Notice: Subject to any disclaimer, the term of this patent is extended or adjusted under 35 U.S.C. 154(b) by 0 days.

(21) Appl. No.: 18/758,906

(22) Filed: Jun. 28, 2024

(51) Int. Cl.

| | |
|---|---|
| ***C11D 1/42*** | (2006.01) |
| ***C11D 7/14*** | (2006.01) |
| ***C11D 7/32*** | (2006.01) |
| ***C11D 7/40*** | (2006.01) |

(52) U.S. Cl.
CPC .............. *C11D 7/3209* (2013.01); *C11D 7/14* (2013.01); *C11D 7/40* (2013.01); *C11D 2111/12* (2024.01); *C11D 2111/40* (2024.01)

(58) Field of Classification Search
CPC ........... C11D 1/40; C11D 1/42; C11D 3/1253; C11D 3/1266; C11D 3/2068; C11D 7/3218; C11D 7/3227; C11D 2111/12
See application file for complete search history.

(56) References Cited

U.S. PATENT DOCUMENTS

| | | | |
|---|---|---|---|
| 3,351,483 A | 11/1967 | Miner, Jr. et al. | |
| 3,594,212 A | 7/1971 | Ditsch | |
| 3,625,905 A | 12/1971 | Weast | |
| 3,886,075 A | 5/1975 | Bernardino | |
| 3,959,155 A | 5/1976 | Montgomery et al. | |
| 3,966,629 A | 6/1976 | Dumbrell | |
| 3,993,573 A | 11/1976 | Gloss | |
| 4,062,647 A | 12/1977 | Storm et al. | |
| 4,292,035 A * | 9/1981 | Battrell | C11D 3/126 510/516 |
| 4,294,710 A | 10/1981 | Hardy et al. | |
| 4,338,204 A * | 7/1982 | Spadini | C11D 1/65 510/330 |
| 4,375,416 A | 3/1983 | Crisp et al. | |
| 4,514,444 A * | 4/1985 | Ives | D06M 23/04 510/438 |
| 4,536,316 A | 8/1985 | Ramachandran | |
| 4,632,768 A * | 12/1986 | Atkinson | C11D 17/0039 510/307 |
| 4,786,422 A | 11/1988 | Kern | |
| 4,806,253 A * | 2/1989 | Burckett St. Laurent | C11D 1/62 510/516 |
| 4,840,738 A | 6/1989 | Hardy et al. | |
| 4,844,824 A | 7/1989 | Mermelstein et al. | |
| 4,846,990 A | 7/1989 | Upadek et al. | |
| 5,503,756 A | 4/1996 | Corona, III et al. | |
| 5,916,863 A | 6/1999 | Iacobucci et al. | |
| 6,313,080 B1 * | 11/2001 | Boskamp | C11D 3/126 510/330 |
| 6,436,889 B1 | 8/2002 | Sta et al. | |
| 6,727,220 B1 | 4/2004 | Grainger et al. | |
| 2002/0155970 A1 * | 10/2002 | Moorfield | C11D 3/1253 510/391 |
| 2003/0130152 A1 | 7/2003 | Heinzman et al. | |
| 2003/0139309 A1 | 7/2003 | Brockett et al. | |
| 2003/0232731 A1 | 12/2003 | Cao et al. | |
| 2008/0305984 A1 | 12/2008 | Ford et al. | |
| 2011/0112317 A1 * | 5/2011 | Scheibel | C11D 3/3942 554/92 |
| 2017/0186309 A1 | 6/2017 | Hulskotter et al. | |
| 2022/0195338 A1 | 6/2022 | McGrane et al. | |

FOREIGN PATENT DOCUMENTS

| | | | |
|---|---|---|---|
| BR | 102022005852 | A2 | 10/2023 |
| CA | 1152262 | * | 8/1983 |
| CA | 1152262 | A | 8/1983 |
| CA | 1203651 | * | 4/1986 |
| CA | 1203651 | A | 4/1986 |
| EP | 299575 | * | 1/1989 |
| EP | 0299575 | A1 | 1/1989 |
| EP | 0313146 | A2 | 4/1989 |
| EP | 0426906 | A1 | 5/1991 |
| GB | 2190921 | A | 12/1987 |
| GB | 2331305 | A | 5/1999 |
| WO | 1995008618 | A1 | 8/1994 |
| WO | 1995027037 | A1 | 3/1995 |
| WO | 1995033038 | A1 | 12/1995 |
| WO | 2001083663 | A1 | 11/2001 |
| WO | 2005012629 | A1 | 2/2005 |
| WO | 2019070838 | A1 | 4/2019 |
| WO | 2019084375 | A1 | 5/2019 |
| WO | 2023099595 | A1 | 6/2023 |

* cited by examiner

*Primary Examiner* — Charles I Boyer
(74) *Attorney, Agent, or Firm* — McDonnell Boehnen Hulbert & Berghoff LLP

(57) ABSTRACT

The present disclosure relates generally to fabric softener compositions and processes for treating fabric using the same. The fabric softener compositions described herein include a smectite clay; a non-polymeric amine component selected from the group consisting of primary amines, secondary amines and tertiary amines; a water-soluble metal halide or sulfate; and optionally, an oil selected from the group consisting of a mineral oil and a vegetable oil.

22 Claims, No Drawings

SMECTITE CLAY-BASED FABRIC SOFTENER COMPOSITIONS WITH ETHERAMINE STABILIZERS

BACKGROUND OF THE DISCLOSURE

1. Field

The present disclosure relates generally to fabric softener compositions and processes for treating fabric using the same, especially in the rinse cycle.

2. Technical Background

Consumers desire their washed clothing to not only look clean but also to feel soft. Textiles that have been washed, especially those made from cellulose fibers like cotton fabrics, can have a harsh feeling after drying. Accordingly, it is common to use a "softening" agent, either in the washing detergent itself, or in a separate fabric softener treatment applied during the rinse. These materials are often based on long-chain quaternary ammonium salts, such as di(fatty alkyl)dimethylammonium salts, and are often provided to the rinse cycle through a dispenser built into a washing machine.

More recently, compounds known as "esterquats" have been developed as softening agents. They, too, are quaternary ammonium compounds that can provide a high charge density, but have ester linkages in their aliphatic chains (e.g., beta to the ammonium group), often formed by reaction between alkanolamines and fatty acids. The ester linkage can be hydrolyzed to provide degradation products that are more easily digested in waste treatment processes, which can improve the environmental effect of such materials. However, the ester linkages of these newly-developed materials can lead to hydrolytic instability.

Moreover, fabric softeners based primarily on organic compounds like quaternary ammonium compounds and polymeric softeners can present a significant burden on water waste management systems. Even in cases where the quaternary ammonium is a so-called "esterquat," the fatty acid breakdown product is a substantial organic compound that must be removed during water treatment.

What is needed is a new type of fabric softener composition, especially for use in rinse applications.

SUMMARY OF THE DISCLOSURE

In one aspect, the present disclosure provides a fabric softener composition. The fabric softener composition includes:

a smectite clay;

a non-polymeric amine component selected from the group consisting of primary amines, secondary amines and tertiary amines;

a water-soluble metal halide or sulfate; and optionally, an oil selected from the group consisting of a mineral oil and a vegetable oil.

In another aspect, the present disclosure provides a process for treating fabric, the process comprising contacting a fabric softener composition as described herein and one or more fabric items in water; and isolating the one or more fabric items from the water.

DETAILED DESCRIPTION

The present inventor has noted that while smectite clays have been suggested for use in softening fabrics in the wash cycle, for example, when provided as components of detergent formulations, they have not been used with any measure of success in the rinse cycle, either in liquid or solid form. The use of smectite clay as a fabric softener, especially in the absence of other components of a detergent formulation, can be challenging. The present inventor notes that smectite clays typically have a negative charge on their surface, but that the surfaces of fabrics are also generally anionic. As such, it can be challenging for clay to deposit onto the fabric surface as necessary for it to exert its softening effect.

The present inventor has provided a smectite clay-based fabric softener that can be either in liquid form or a solid form. The solid form can be, for example, a powder, a pellet or a tablet. When the fabric softener is in liquid form, water is desirably used as a medium, provided in an amount to provide the fabric softener with a desirable volume (e.g., 30 mL for a dose) and viscosity (e.g., thin enough to be reliably dispensed by an automatic dispenser of a washing machine. The smectite clay fabric softening agent can advantageously be dosed on the wet fabrics during the rinse cycle, after the detergent treatment during the washing cycle of a washing machine, and often after an initial rinse to substantially remove residual detergent from the wash cycle. Of course, modern washing machines are designed to automatically dispense the fabric softener at the appropriate time in the rinse cycle and commercially available liquid fabric softeners are meant to be dispensed directly by the machine when the required amount of fabric softener is charged at the designated location of the machine at the start of the wash. The compositions of the present disclosure, especially in liquid form, can be dispensed in similar fashion.

The present disclosure provides a smectite clay-based fabric softening composition that can provide for a high degree of softening, which, without being bound by theory, is believed to result from a high degree of uniform deposition of clay onto the fabric without substantial clumping or flocculation. The results can be at least comparable to presently-available commercial fabric softener formulations. As smectite clay is used as a primary softening component, softened fabrics, even cellulosic fabrics such as cotton, can be effectively softened while retaining water absorbency. Moreover, lint generation during drying can be low, and comparable to lint generation from use of commercially-available liquid fabric softeners. The present disclosure provides an improved fabric softener that enables effective softening by uniform deposition of smectite clay onto the fabric, without substantial clumping or flocculation.

The present inventor has specifically found that the inclusion of a non-polymeric amine component and a water-soluble metal halide or sulfate can help a smectite clay to provide highly efficient softening. Without intending to be bound by theory, the present inventor surmises that the high efficiency of softening is a result of efficient deposition of the smectite clay onto the fabric surface. The non-polymeric amine component is believed to interact at least in part on the clay and increase the overall positive charge on the clay, facilitating the deposition of the clay onto the negatively charged fabric surface. Additionally, the present inventor has found that addition of a water-soluble metal halide or sulfate can help uniformly disperse the smectite clay, e.g., in the form of very small particles. The uniformly-dispersed smectite clay can be uniformly deposited on the fabric surface, thus improving the degree of softening that can be achieved from a given dose of smectite clay.

Accordingly, the present disclosure provides clay-based fabric softener compositions and processes using the same to treat fabric and enhance their softness.

Fabric Softener Compositions

One aspect of the disclosure provides a fabric softener composition that includes:

a smectite clay;

a non-polymeric amine component selected from the group consisting of primary amines, secondary amines and tertiary amines;

a water-soluble metal halide or sulfate; and optionally, an oil selected from the group consisting of a mineral oil and a vegetable oil.

While the compositions of the disclosure are described with respect to components in the singular (e.g., "a smectite clay," and "a non-polymeric amine component") for the purposes of simplicity of description, the person of ordinary skill in the art will understand that such descriptions, especially when used in the appended embodiments, can likewise to refer to more than one such component, with the amount for the singular component as described also referring to the total amount of multiple such components. Thus, "a water-soluble metal halide or sulfate present in an amount in the range of 1-5 wt %" will be understood to refer to one or more metal halides or sulfates present in an total amount of 1-5 wt %.

As described above, the fabric softener compositions of the present disclosure include a smectite clay. Smectite clays have cation exchange properties and will swell when contacted by water. The smectite clay is a primary softening ingredient in the composition. Notably, as described in detail below, the smectite clay can be deposited on a fabric by treatment with the fabric softener composition after the fabric is washed with a detergent, e.g., during the rinse cycle of a washing machine.

In various embodiments of the disclosure as described herein, the smectite clay comprises (or is) a bentonite clay. In various embodiments, the smectite clay comprises (or is) a montmorillonite clay. In some embodiments, the smectite clay comprises (or is) a hectorite clay. Of course, combinations of smectite clays can be used.

Notably, using the compositions and techniques described herein, the smectite clay can be provided to the fabric in finely divided form. The finely divided form of the smectite clay can advantageously enable the smectite clay particles to remain suspended in solution. In various embodiments, when the fabric softener composition is provided as an aqueous solution, the smectite clay particles can remain suspended in aqueous media for 30 minutes or even longer. Moreover, when the smectite clay is in a finely divided particulate form, it can more readily interact with the non-polymeric amine component.

In various embodiments the smectite clay does not impart color that is readily noticeable to the naked eye on dried fabrics. The smectite clay thus need not be of a highly white color. The present inventor has used pink and yellow smectite clays as described herein without noticeable discoloration of fabric, even on white cotton towels.

Based on the disclosure herein, the person of ordinary skill in the art can select desirable amounts of smectite clay, especially with the understanding that compositions of the disclosure can desirably include relatively large amounts of smectite clay to provide a high degree of softening. In various embodiments of the present disclosure as described herein, the smectite clay is present in the fabric softener composition in an amount in the range of 5-90 wt %, on a dry solids basis. As used herein, "dry solids basis" is understood to refer to the weight of a component in the substantial absence of any evaporable medium (i.e., a medium that has a boiling point at 1 atm pressure of no more than 110° C., excluding any volatile portions of the oil), e.g., on a moisture-free basis. For example, in various embodiments, the smectite clay is present in an amount in the range of 20-90 wt %, e.g., 20-75 wt %, or 20-60 wt %, or 20-50 wt %, or 20-40 wt %, on a dry solids basis. In some embodiments, the smectite clay is present in an amount in the range of 25-90 wt %, e.g., 25-80 wt %, or 25-70 wt %, or 25-60 wt %, or 25-50 wt %, or 25-40 wt %, on a dry solids basis. For example, in various embodiments, the smectite clay is present in an amount in the range of 30-90 wt %, e.g., 30-80 wt %, or 30-70 wt %, or 30-60 wt %, or 30-50 wt %, on a dry solids basis. In some embodiments, the smectite clay is present in an amount in the range of 40-90 wt %, e.g., 40-80 wt %, or 40-70 wt %, or 40-60 wt %, on a dry solids basis. In some embodiments, the smectite clay is present in an amount in the range of 50-90 wt %, e.g., 50-80 wt %, or 50-70 wt %, on a dry solids basis.

As described above, the fabric softener compositions of the present disclosure include a non-polymeric amine component selected from the group consisting of primary amines, secondary amines, and tertiary amines (i.e., and mixtures thereof). Such amines, depending on formulation pH, may be at least partially protonated (i.e., in an ammonium form). However, any quaternary amines present are not considered to be a "non-polymeric amine component." Moreover, any polymeric amines (as used herein, polymers comprising monomers with at least one nitrogen atom and having a weight-average molecular weight of greater than 1000 g/mol) and polyamines (as used herein, compounds having two or more amino nitrogen atoms) are likewise not considered to be a "non-polymeric amine component."

Without intending to be bound by theory, the present inventor believes that the non-polymeric amine component can interact with the smectite clay (e.g., by being deposited thereon). This imparts a positive charge to the smectite clay, which can facilitate deposition of the clay particles onto the fabric. The oil, when present in the composition, can in many embodiments also associate with the amine, which helps to prevent the oil from separating from the aqueous phase in liquid media.

In various embodiments as otherwise described herein, the non-polymeric amine component includes (or is) one or more of a secondary amine and a tertiary amine. In various embodiments, the non-polymeric amine component includes (or is) a tertiary amine. As would be appreciated by the person of ordinary skill in the art, amines, be they primary, secondary, or tertiary, can have substantial basic character, and can thus function as organic bases.

The present inventor has found, as described below, that smectite clay can provide especially good performance (e.g., a high degree of fabric softening) when used in combination with a non-polymeric amine component that has an increased degree of electropositivity of the nitrogen atom, e.g., by having one or more electron-withdrawing groups bound to the amine nitrogen. As described above, deposition of smectite clay on the surface of the fabric can be challenging because both can be negatively charged. Without intending to be bound by theory, the present inventor believes that an increased degree of electropositivity on the nitrogen atom can facilitate interaction between the non-polymeric amine component and the smectite clay. Further, the increased degree of electropositivity of the nitrogen atom can increase cationic character of the smectite clay on which it is deposited, thus facilitating the deposition of smectite clay onto the surface of the fabric.

For example, in various embodiments of the disclosure as described herein, the non-polymeric amine component includes (or is) a non-polymeric amine component having an electron-withdrawing group bound to an amine nitrogen atom thereof, wherein the electron-withdrawing group comprises at least one atom having a Pauling electronegativity of at least 3.2 (e.g., at least 3.3, or at least 3.4) that is not directly bound to the amine. The person of ordinary skill in the art would appreciate that atoms with high Pauling electronegativity can increase the electropositivity of the nitrogen of the amine by inductively pulling electron density away from the nitrogen atom. However, the person of ordinary skill would also appreciate that such inductive effects weaken with increasing distance of the electronegative atom from the nitrogen atom. As such, in some embodiments, the atom having a Pauling electronegativity of at least 3.2 (e.g., at least 3.3, or at least 3.4) is no more than 4 atoms away from the nitrogen atom. For example, in some embodiments, the atom having a Pauling electronegativity of at least 3.2 is no more than 3 atoms away, or no more than 2 atoms away from the nitrogen atom.

The atom having a Pauling electronegativity of at last 3.2 can be, in various desirable embodiments, an oxygen atom.

In various embodiments, the amine can have three nitrogen substituents having electronegative atoms positioned as described above. In various embodiments, the amine can have two nitrogen substituents having electronegative atoms positioned as described above. In various embodiments, the amine can have one nitrogen substituent having an electronegative atom positioned as described above.

For example, in various embodiments of the disclosure as described herein, the non-polymeric amine component includes (or is) an amine with one or more oxyalkyl groups bound thereto. For example, in some embodiments, the non-polymeric amine component includes an amine with one or more oxyethyl groups or one or more 3-oxypropyl groups bound thereto. As an example, a 2-oxyethyl substituent on a nitrogen has an oxygen three atoms away from the nitrogen, and an 3-oxypropyl substituent on a nitrogen has an oxygen four atoms away from the nitrogen. The oxyalkyl groups can be variously substituted at the oxygen end, e.g., with hydrogen or alkyl (which itself may be further substituted, e.g., as part of a poly(ethylene glycol) chain. For example, in various embodiments as described herein, the one or more oxyalkyl groups are one or more hydroxyalkyl groups and/or one or more alkyloxyalkyl groups (e.g., a long-chain alkyloxyalkyl such as an alkyloxyethyl or an alkyloxypropyl, or a poly(ethylene glycol) residue). As discussed above, the oxygen atom of the oxyalkyl groups is desirable be close enough to the nitrogen atom of the non-polymeric amine component to inductively draw electron density away from the nitrogen atom. As such, in various embodiments as described herein, the one or more oxyalkyl groups are oxyethyl groups and/or oxypropyl groups. In some particular embodiments, the one or more oxyalkyl groups are oxyethyl groups.

Amines with one or more oxyethyl groups bound thereto can be prepared from the ethoxylation of amines. Amines can react with various amounts (e.g., typically quantified as molar equivalents) of ethylene oxide to provide ethoxylated amines, i.e., etheramines bearing oxyalkyl groups having the structural formula $—(CH_2CH_2O)_xH$. The present inventor notes that a sharp change in turbidity of the fabric softener composition is observed after fabric treatment, suggesting that etheramines have a high capability for depositing smectite clay particles onto the fabric surface. For example, in various embodiments of the disclosure as described herein, one or more of the oxyalkyl groups have the structural formula $—(CH_2CH_2O)_xH$, wherein x has a weight-average value in the range of 1-10. For example, in various embodiments, x has a weight-average value in the range of 1.8-10, e.g., in the range of 1.8-6, or in the range of 1.8-4, or in the range of 1.8-2.5. In various embodiments, x has a weight-average value in the range of 4-10, e.g., in the range of 4-6.

In some embodiments as described herein, the non-polymeric amine component includes an etheramine. In various embodiments, the etheramine comprises a substituent on nitrogen having the structural formula $R_1—O—(CH_2)_{2-3}—$, in which $R_1$ is an aliphatic branched or straight-chain hydrocarbyl group having a weight-average number of carbons in the range of 8-16.

Etheramines can be ethoxylated to provide especially desirable non-polymeric amine components. For example, in various embodiments, the non-polymeric amine component has the structural formula (I)

(I)

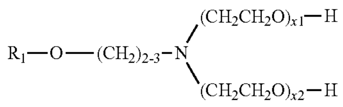

in which $R_1$ is an aliphatic branched or straight-chain hydrocarbyl group having a weight-average number of carbons in the range of 8-16, and the sum of x1 and x2 has a weight-average value in the range of 1-10. In some embodiments, $R_1$ is an aliphatic branched or straight-chain hydrocarbyl group having a weight-average number of carbons in the range of 8-12. In some embodiments as described herein, $R_1$ is an aliphatic branched or straight-chain hydrocarbyl group having a weight-average number of carbons of about 10 or about 13. As used herein, a "hydrocarbyl group" refers to a non-aromatic monovalent hydrocarbon radical. In various embodiments, the sum of x1 and x2 has a weight average value in the range of 1.8-10, e.g., in the range of 1.8-6, in the range of 1.8-4, or in the range of 1.8-2.5. In some embodiments, the sum of x1 and x2 has a weight average value in the range of 4-10 or in the range of 4-6.

The structure of $R_1$ is not particularly limited, and the person of ordinary skill in the art would be able to select amines of structural formula (I) with an $R_1$ substituent that imparts desirable properties onto the fabric softener composition. In various embodiments as described herein, $R_1$ is branched, e.g., iso-branched. For example, in some embodiments, $R_1$ is branched decyl, e.g., isodecyl. In some embodiments, $R_1$ is branched tridecyl, e.g., isotridecyl. The present inventor has found that various commercially available ethoxylated etheramines can be used to impart desirable properties to the fabric softener compositions disclosed herein. In various embodiments of the disclosure as described herein, the non-polymeric amine component comprises one or more of poly (2) oxyethylene isodecyloxypropylamine (known commonly by the name "bis(2-hydroxyethyl) isodecyloxypropylamine"), poly (5) oxyethylene isodecyloxypropylamine, poly (2) oxyethylene isotridecyloxypropylamine (known commonly by the name "bis(2-hydroxyethyl) isotridecyloxypropylamine"), and poly (5) oxyethylene isotridecyloxypropylamine. The person of ordinary skill in the art will appreciate that the reaction of amines with ethylene oxide to provide ethoxylated etheramines generally results in mixtures of products. As such, when naming ethoxylated etheramines, the number denoted in parentheses generally refers to the weight-average number of equivalents of oxyethyl groups substituted to the amine. For example, poly (5) oxyethylene isodecyloxypropylamine, which can be described by structural formula (I) wherein $R_1$ is isodecyloxypropyl, encompasses a range of compounds wherein the sum of x1 and x2 (e.g., compounds of (1) wherein x1 is 2 and x2 is 3, or compounds of (1) wherein x1 is 4 and x2 is 1, etc.). In some embodiments as described herein, the non-polymeric amine component comprises (or is) poly (2) oxyethylene isodecyloxypropylamine. In various embodiments, non-polymeric amine component comprises (or is) poly (5) oxyethylene isodecyloxypropylamine. Poly (2) oxyethylene isodecyloxypropylamine and poly (5) oxyethylene isodecyloxypropylamine are commercially available as Tomamine® E-14-2 and E-14-5, respectively. Poly (2) oxyethylene isotridecyloxypropylamine (commonly known as bis-2(hydroxyethyl) isotridecyloxypropylamine) and poly (5) oxyethylene isotridecyloxypropylamine are commercially available as Tomamine® E-17-2 and E-17-5, respectively.

In other embodiments, the non-polymeric amine component includes (or is) a compound having the structural formula $R_1—O—(CH_2)_{2-3}—NH_2$, wherein $R_1$ is as described above. Such an etheramine component can be, e.g., in the form of a salt, such as an acetic acid salt. For example, in various embodiments, the non-polymeric amine component includes (or is) a compound includes (or is) isodecyloxypropylammonium acetate (commercially available as Tomamine® PA-14 acetate) or isotridecyloxypropylammonium acetate.

In various embodiments as otherwise described herein, the non-polymeric amine component of the present disclosure does not include fatty amines. For example, in various embodiments as described herein, the fabric softener composition has no more than 1 wt % of hydrocarbyl amines having amine-bound hydrocarbyl groups of 8 or more carbons (i.e., be they in ammonium form or in free base form), on a dry solids basis.

Based on the disclosure herein, the person of ordinary skill in the art can select a desirable amount of non-polymeric amine component. The person of ordinary skill in the art can determine an amount of a particular non-polymeric amine component that provides for efficient softening by the clay and good dispersion of any oil component present.

In various embodiments as otherwise described herein, the non-polymeric amine component is present in an amount of at least 1 wt %, e.g., at least 2 wt %, or at least 5 wt %, or at least 10 wt %, or at least 20% on a dry solids basis. The person of ordinary skill in the art will appreciate that the "dry solids basis" as defined herein can still apply to the liquid components of the fabric softener composition disclosed herein (e.g., the non-polymeric amine component and the oil) even though such components are not themselves solids. Rather, consistent with usage in the formulation arts, "dry solids basis" refers to a comparison with the total non-evaporable liquid components of the composition.

In various embodiments of the disclosure as described herein, the non-polymeric amine component is present in an amount in the range of 1-75 wt %, on a dry solids basis. For example, in various embodiments as described herein, the non-polymeric amine component is present in an amount in the range of 1-50 wt %, e.g., in the range of 1-40 wt %, or 1-30 wt %, or 1-20 wt %, or 1-10 wt %, on a dry solids basis. In some embodiments, the non-polymeric amine component is present in an amount in the range of 2-75 wt %, e.g., in the range of 2-50 wt %, or 2-40 wt %, or 2-30 wt %, or 2-20 wt %, or 2-10 wt %, on a dry solids basis. In various embodiments, the non-polymeric amine component is present in an amount in the range of 5-75 wt %, e.g., in the range of 5-50 wt %, or 5-40 wt %, or 5-30 wt %, or 5-20 wt %, or 5-10 wt %, on a dry solids basis. For example, in some embodiments, the non-polymeric amine component is present in an amount in the range of 10-75 wt %, e.g., in the range of 10-50 wt %, or 10-40 wt %, or 10-30 wt %, or 10-20 wt %, on a dry solids basis.

As described above, the non-polymeric amine component can be deposited onto the smectite clay particles and facilitate the deposition of clay particles onto the fabric. Thus, it can be desirable to provide the smectite clay and non-polymeric amine component in a particular ratio. In various embodiments of the disclosure as described herein, a weight ratio of smectite clay to non-polymeric amine component is in the range of 0.2:1 to 10:1, e.g., in the range of 1:1 to 10:1 or 2:1 to 10:1, or 3:1 to 10:1. In some embodiments, a weight ratio of smectite clay to non-polymeric amine component is in the range of 0.2:1 to 8:1, e.g., in the range of 1:1 to 8:1, or 2:1 to 8:1, or 3:1 to 8:1. For example, in various embodiments, a weight ratio of smectite clay to non-polymeric amine component is in the range of 0.2:1 to 6:1, e.g., in the range of 1:1 to 6:1, or 2:1 to 6:1, or 3:1 to 6:1. Like weight percentages, weight ratios are determined on a dry solids basis.

The present inventor notes that amines by themselves (i.e., without the presence of smectite clay as described herein) can sometimes be capable of imparting some softness to fabrics when used in the rinse cycle of the wash. But even at five times the dosages described in the formulation examples below, the present inventor noted that the softness achieved is less than when used with smectite clay. In such clay-free formulations, the high level of amines in the dosage also increases the organic content of the composition, which can be undesirable.

The fabric softener compositions of the present disclosure also comprise a water-soluble metal halide or sulfate. Without intending to be bound by theory, the present inventor believes that the water-soluble metal halide or sulfate can help reduce the viscosity by suppressing the swelling of clay, especially when the fabric softener is provided as a liquid formulation. A thin and easily poured fabric softener is desirable for consumers due to ease of use with modern washing machines.

Advantageously, metal halides and sulfates provide a desirable thinning effect without any undesirable side-reactions with the other components of the fabric softener composition. Unlike metal carbonates, for example, metal halides and sulfates do not react with calcium present in the smectite clay.

In various embodiments of the disclosure as described herein, the metal ion of the water-soluble metal halide or sulfate comprises an alkali metal ion or an alkaline earth metal ion. For example, in various embodiments, the water-soluble metal halide or sulfate comprises a sodium salt, a potassium salt, a calcium salt, or a magnesium salt. In various embodiments, the water-soluble metal halide or sulfate comprises (or is) a halide, e.g., a chloride. In other embodiments, the water soluble metal halide or sulfate comprises a sulfate. The present inventor notes that sodium chloride can be advantageous as the water soluble metal halide or sulfate due to its widespread availability and low cost. As such, in various embodiments as described herein, the water-soluble metal halide or sulfate comprises (or is) sodium chloride or sodium sulfate. For example, in some embodiments, the water-soluble metal halide or sulfate comprises (or is) sodium chloride.

The person of ordinary skill in the art can, based on the disclosure herein, provide an amount of water-soluble metal halide or sulfate that provides a desirably thin liquid and a desirable dispersion of the smectite clay in water. In various embodiments of the disclosure as described herein, the water-soluble metal halide or sulfate is present in an amount in the range of 0.1-10 wt %, e.g., 0.1-7.5 wt %, or 0.1-5 wt %, measured as a weight percentage of the overall composition. For example, in some embodiments, the water-soluble metal halide or sulfate is present in an amount in the range of 0.2-10 wt %, e.g., 0.2-7.5 wt %, or 0.2-5 wt %, of the composition. In some embodiments, the water-soluble metal halide or sulfate is present in an amount in the range of 0.5-10 wt %, e.g., 0.5-7.5 wt %, or 0.5-5 wt %, of the composition. In certain embodiments, the water-soluble metal halide or sulfate is present in an amount in the range of 1-3 wt %, of the composition.

The water-soluble metal halide or sulfate can be present in certain amounts relative to the smectite clay. In various embodiments of the disclosure as described herein, a weight ratio of the water-soluble metal halide or sulfate to the smectite clay is in the range of 0.01:1 to 0.5:1, e.g., in the range of 0.01:1 to 0.4:1, or 0.01:1 to 0.3:1, or 0.01:1 to 0.2:1. In various embodiments, a weight ratio of the water-soluble metal halide or sulfate to the smectite clay is in the range of 0.05:1 to 0.5:1, e.g., in the range of 0.05:1 to 0.4:1, or 0.05:1 to 0.3:1, or 0.05:1 to 0.2:1.

The present inventor has found that the addition of an oil to the fabric softener composition can be beneficial. The present inventor has found that while a fabric softener composition made with the smectite clay, the non-polymeric amine component, and sodium chloride as the water-soluble metal halide (i.e., wherein the fabric softener composition does not contain an oil) can soften fabric, the softness achieved may in some cases have a dry feel Advantageously, the present inventor has found that the addition of an oil (e.g., a mineral oil) to the fabric softener composition can impart a silky feel to the treated fabric, while mitigating the occasional harsh feel of the dry fabric under some ambient conditions. This harsh feel can also be observed under some ambient conditions when treating the fabrics with commercially available liquid fabric softeners. As such, in various embodiments of the disclosure as described herein, the oil is present in the fabric softener composition. Notably, the non-polymeric amine component can help to disperse the oil in water, so that liquid compositions can be provided without substantial oil separation.

For example, in various embodiments, the oil includes (or is) a mineral oil. Advantageously, the present inventor has found that mineral oils do not degrade in aqueous environments, thus extending the shelf-life of water-based liquid formulation of the present fabric softener compositions. And the present inventor has found that mineral oils can often provide better performance than vegetable oils. But in some embodiments, the oil can include, or even be a vegetable oil.

The amount of the oil used is not particularly limited. In various embodiments of the disclosure as descried herein, the oil is present in an amount up to 25 wt %, e.g., up to 20 wt %, or up to 15 wt %, on a dry solids basis. For example, in various embodiments, the oil is present in an amount in the range of 0.5-25 wt %, e.g., 0.5-20 wt %, or 0.5-15 wt %, on a dry solids basis. In some embodiments, the oil is present in an amount in the range of 1-25 wt %, e.g., 1-20 wt %, or 1-15 wt %, on a dry solids basis. For example, in some embodiments, the oil is present in an amount in the range of 2-25 wt %, e.g., 2-20 wt %, or 2-15 wt %, on a dry solids basis. In some embodiments, the oil is present in an amount in the range of 5-25 wt %, e.g., 5-20 wt %, or 5-15 wt %, on a dry solids basis.

The person of ordinary skill in the art would appreciate that the non-polymeric amine component and, if present, oil are the organic components of the fabric softener composition. As discussed below, the fabric softener composition can be provided in liquid form through the addition of water. As such, the non-polymeric amine component and oil can be present in appropriate amounts (i.e., relative to each other and total organic content of the fabric softener) such that a liquid formulation of the fabric softener composition is stable and homogenous. Desirably, the liquid composition is free of a sheen of oil on the liquid surface.

For example, in various embodiments of the disclosure as described herein, a weight ratio of the oil to the non-polymeric amine component is in the range of 0.05:1 to 1.5:1, e.g., 0.05:1 to 1.2:1, or 0.05:1 to 1:1. In various embodiments, a weight ratio of the oil to the non-polymeric amine component is in the range of 0.1:1 to 1.5:1, e.g., 0.1:1 to 1.2:1, or 0.1:1 to 1:1. In some embodiments, a weight ratio of the oil to the non-polymeric amine component is in the range of 0.2:1 to 1.5:1, e.g., 0.2:1 to 1.2:1, or 0.2:1 to 1:1. In various embodiments, a weight ratio of the oil to the non-polymeric amine component is in the range of 0.3:1 to 0.8:1, e.g., or 0.4:1 to 0.8:1, or 0.6:1 to 0.8:1.

As discussed above, the total organic content (i.e., including the non-polymeric amine component and, if present, the oil and any other organic components) can be relatively low to help provide an aqueous liquid formulation of the fabric softener composition that is stable. A relatively low total organic content can have additional benefits, such as reducing the environmental impact and flammability of fabrics treated and dried with the fabric softener composition of the present disclosure. For example, in various embodiments of the disclosure as described herein, the fabric softener composition has total organic content of no more than 10 wt % of the total composition weight, e.g., no more than 5 wt % (especially in liquid compositions). In various embodiments, the fabric softener composition has no more than 50 wt % organic content on a dry solids basis, e.g., no more than 30 wt %, or no more than 20 wt %. Such compositions with a relatively low total organic content can be denoted as so-called "green label", which can appeal to environmentally conscious consumers. Reduced organic content can also help to substantially reduce cost of materials for the fabric softener composition. Furthermore, the fabric softener can simplify the manufacturing process due to its relatively few ingredients, which can lower the cost of production.

The fabric softener composition can include additional components that can be beneficial when treating fabrics. For example, fragrances, tints and biocides can be used to provide further treatment of the fabric. As such, in various embodiments, the fabric softener composition further comprises one or more additional components selected from the group consisting of fragrances, tint, and biocides. However, such additional components should not be substantially reactive with the smectite clay or the non-polymeric amine component.

Notably, the fabric softener compositions described herein does not require the use of quaternary amine-bearing compounds, polymeric amines, or polyamines to achieve a softening effect. As used herein, the term "polymeric" refers to compounds with molecular weights of greater than 1000 g/mol, and the term "polyamine" refers to compounds having two or more amino nitrogen atoms. In various embodiments of the disclosure as described herein, the fabric softener composition has no more than 5 wt % of quaternary amine-bearing compounds, e.g., no more than 2 wt %, or no more than 1 wt %, or no more than 0.5 wt %, on a dry solids basis. In some embodiments, the fabric softener composition has no more than 0.1 wt % of quaternary amine-bearing compounds, e.g., no more than 0.05 wt %, or no more than 0.01 wt %, or no more than 0.005 wt %, or no more than 0.002 wt %, on a dry solids basis. In particular embodiments, the fabric softener composition has substantially no quaternary amine-bearing compounds. In various embodiments of the disclosure as described herein, the fabric softener composition has no more than 2 wt % of polymeric amine-bearing compounds and/or polyamine compounds, e.g., no more than 1 wt %, or no more than 0.5 wt %, or no more than 0.2 wt %, on a dry solids basis. In some embodiments of the disclosure as described herein, the fabric softener composition has substantially no polymeric amine-bearing compounds and/or polyamine compounds.

As described above, the combination of the non-polymeric amine component and the metal halide or sulfate help disperse the smectite clay uniformly. As such, the presence of flocculants can be undesirable, as the flocculants can limit the spread ability of the smectite clay, thus reducing any softening affect. In various embodiments of the disclosure as described herein, the fabric softener composition has no more than 2 wt % of polymeric flocculants, e.g., no more than 0.5 wt %, or no more than 0.05 wt %, or no more than 0.005 wt %, or no more than 0.001 wt %, on a dry solids basis as measured with respect to the weight of the smectite clay. Thus, polymer-flocculated clays can be undesirable for use in various embodiments of the disclosure.

The present inventor has generally noted that polymeric components are not necessary in various embodiments of the compositions of the disclosure. Thus, in some embodiments, the fabric softener composition has no more than 2 wt % of polymeric components, e.g., no more than 1 wt %, or no more than 0.5 wt %, or no more than 0.2 wt %, on a dry solids basis. In some embodiments, the fabric softener composition has substantially no polymeric components.

The fabric softener composition can be provided in a variety of forms. Conventional household washing machines can dispense liquid fabric softener onto fabrics during the so-called "rinse-through" cycle, and such washing machines can typically apply around 30 mL of fabric softener to a medium-sized load of laundry, which is typically 2.5-3 kg of fabric, on a dry basis. As such, it can be desirable to provide the fabric softener composition in a form and amount that is suitable for integration with conventional household washing machines. For example, in various embodiments of the disclosure as described herein, the fabric softener composition is in substantially liquid form. This can be accomplished with the addition of water. For example, in various embodiments, the fabric softener composition further comprises water. The amount of water is not particularly limited, and the person of ordinary skill in the art can determine an appropriate amount of water to achieve desired rheological properties (e.g., pourability) and dosing amount when used with a washing machine. For example, in some embodiments, water is present in an amount up to 1000 wt %, e.g., up to 800 wt %, or up to 600 wt %, or up to 300%, taking the total amount of dry solids as 100 wt %. In various embodiments, water is present in an amount sufficient to provide a dose of the fabric softener composition of about 30 g for a load of laundry in the range of 2.5-3 kg, based on dry fabric weight. As discussed above, the fabric softener composition is stable, and this remains the case when the fabric softener composition is provided in liquid form. For example, in some embodiments, the fabric softener composition is in liquid form and no oil sheen is observed on a liquid surface of the composition. The stability of the fabric softener compositions of the present disclosure can impart a variety of other benefits. For example, the present inventor has found that the fabric softener compositions of the present disclosure can be safely stored for extended periods of time without gelling. Further, the fabric softener compositions of the present disclosure do not gel after being frozen, and its original rheological properties can be restored after thawing and shaking.

Additional components can be included in the fabric softener composition to provide desirable rheological properties. While the present inventor notes that the water-soluble metal halide or sulfate can disperse the smectite clay particles in the fabric softener composition, additional organic dispersants can be used in conjunction with the water-soluble metal halide or sulfate to achieve desired rheological properties. The identity of the organic dispersant is not particularly limited. For example, the organic dispersant can be an ionic organic dispersant, such as polyaspartate, or a nonionic organic dispersant, such as fatty alcohol ethoxylates, alkyl phenyl ethoxylates, and fatty acid alkoxylates. For example, in various embodiments as described herein, the fabric softener composition further comprises an organic dispersant selected from the group consisting of polyaspartate, a fatty alcohol ethoxylate, an alkyl phenyl ethoxylate, a fatty acid alkoxylate, and a combination thereof. In various embodiments, a weight ratio of the organic dispersant to the smectite clay is in the range of 0.05:1 to 0.15:1.

Liquid fabric softener compositions can be provided by techniques familiar to the person of ordinary skill in the art. For example, in some embodiments, the clay can be slurried in a portion of water with the salt, then milled or ground to disperse, e.g., in a mill or a Waring blender. The non-polymeric amine component can be combined with a portion of oil (if it is to be used) and the organic components can be deposited with agitation onto the dispersed clay. Additional water and/or additional oil can be added in a subsequent agitation step, if desired. But the person of ordinary skill in the art will appreciate that well-dispersed liquid formulations can be provided by many techniques.

However, the fabric softener composition can also be provided in a solid form. The fabric softener composition can be provided in a powder or granular form by removing the water and moisture from the liquid form and milling the resulting solids to a desired particle size. This can ensure that components are well-mixed and the final product has a relatively uniform character. Pellets and tablets of the fabric softener composition can be prepared by adding a small amount of water to the fabric softener composition in powder or granular form to act as a binder, and pressing the fabric softener composition into a desired shape. For example, in various embodiments as described herein, the fabric softener composition can be in substantially solid form, e.g., in a powder form, a granular form, a pellet form, or a tablet form.

Treatment of Fabric

Another aspect of the present disclosure is a process for treating fabric comprising: contacting a fabric softener composition as described herein and one or more fabric items in water; and isolating the one or more fabric items from the water.

An additional aspect of the present disclosure is a process for treating fabric comprising: a softening operation comprising contacting in water one or more fabric items with a smectite clay; a non-polymeric amine component selected from the group consisting of primary amines, secondary amines, and tertiary amines; a water-soluble metal halide or sulfate; and optionally, an oil; and isolating the one or more fabric items from the water. The fabric softener composition can be as described above. For example, in various embodiments as described herein, each of the smectite clay, the non-polymeric amine component, and the water-soluble metal halide and sulfate are as described above. In some embodiments, the oil is as described above.

As described above, conventional washing machines are generally equipped to dispense around 30 mL of fabric softener during the "rinse through" cycle for a medium-sized load of laundry, e.g., 2.5-3.0 kg on a dry fabric basis. As such, each of the components of the fabric softener composition can contact the fabric materials at a particular treat rate.

The fabric softener composition disclosed herein enables the smectite clay to be finely dispersed as smectite clay microparticles and allows for the smectite clay to be effectively deposited on the fabric items. As such, the smectite clay treat rate of the fabric items can be highly efficient. In various embodiments of the disclosure as described herein, a smectite clay treat rate of the fabric items is at least 0.5 g of smectite clay per kg of fabric, e.g., in the range of 0.5-10 g per kg of fabric, e.g., 0.5-5 g per kg of fabric, or 0.5-4 g per kg of fabric, or 0.5-3 g per kg of fabric. In some embodiments, a smectite clay treat rate of the fabric items is at least 1 g of smectite clay per kg of fabric, e.g., in the range of 1-10 g per kg of fabric, e.g., 1-5 g per kg of fabric, or 1-4 g per kg of fabric, or 1-3 g per kg of fabric. In various embodiments, a smectite clay treat rate of the fabric items is at least 1.5 g of smectite clay per kg of fabric, e.g., in the range of 1.5-10 g per kg of fabric, e.g., 1.5-5 g per kg of fabric, or 1.5-4 g per kg of fabric, or 1.5-3 g per kg of fabric. In various embodiments, a smectite clay treat rate of the fabric items is at least 2 g smectite clay per kg fabric, e.g., in the range of 2-10 g per kg fabric, or in the range of 2-5 g per kg fabric, or in the range of 2-4 g per kg fabric, or in the range of 2-3 g per kg fabric. In various embodiments of the present disclosure as described herein, a non-polymeric amine component treat rate of the fabric is at least 0.05 g of non-polymeric amine component per kg of fabric, e.g., in the range of 0.05-5 g per kg of fabric, or 0.05-2.5 g per kg of fabric, or 0.05-2 g per kg of fabric, or 0.05-1 g per kg of fabric. In various embodiments, a non-polymeric amine component treat rate of the fabric is at least 0.15 g of non-polymeric amine component per kg of fabric, e.g., in the range of 0.15-5 g per kg of fabric, or 0.15-2.5 g per kg of fabric, or 0.15-2 g per kg of fabric, or 0.15-1 g per kg of fabric. In some embodiments, a non-polymeric amine component treat rate of the fabric is at least 0.25 g of non-polymeric amine component per kg of fabric, e.g., in the range of 0.25-5 g per kg of fabric, or 0.25-2.5 g per kg of fabric, or 0.25-2 g per kg of fabric, or 0.25-1 g per kg of fabric. The present inventor notes that while amines can impart some softness to fabric items when used in the rinse cycle of the wash without a smectite clay, such compositions require a much higher non-polymeric amine component treat rate of the fabric to achieve a lesser degree of softness. Additionally, such a high non-polymeric amine component treat rate of the fabric would necessitate that the non-polymeric amine component comprise a greater weight percentage of the fabric softener composition, which can lead to unacceptable increases in total organic content.

In various embodiments of the disclosure as described herein, a water-soluble metal halide or sulfate treat rate of the fabric is up to 1.25 g of water soluble metal halide or sulfate per kg of fabric, e.g., up to 1 g per kg of fabric, or up to 0.75 g per kg of fabric, or up to 0.5 g per kg of fabric. In various embodiments as described herein, a water-soluble metal halide or sulfate treat rate of the fabric is at least 0.05 g of water soluble metal halide or sulfate per kg of fabric, e.g., in the range of 0.05-1.25 g per kg of fabric, or 0.05-1 g per kg of fabric, or 0.05-0.75 g per kg of fabric, or 0.05-0.5 g per kg of fabric. For example, in some embodiments, a water-soluble metal halide or sulfate treat rate of the fabric is at least 0.1 g of water soluble metal halide or sulfate per kg of fabric, e.g., in the range of 0.1-1.25 g per kg of fabric, or 0.1-1 g per kg of fabric, or 0.1-0.75 g per kg of fabric, or 0.1-0.5 g per kg of fabric. In various embodiments, a water-soluble metal halide or sulfate treat rate of the fabric is at least 0.2 g of water soluble metal halide or sulfate per kg of fabric, e.g., in the range of 0.2-1.25 g per kg of fabric, or 0.2-1 g per kg of fabric, or 0.2-0.75 g per kg of fabric, or 0.2-0.5 g per kg of fabric.

In various embodiments of the disclosure as described herein, an oil treat rate of the fabric is up to 2.5 g of oil per kg of fabric, e.g., up to 1.5 g per kg of fabric, or up to 1.0 g per kg of fabric, or up to 0.5 g per kg of fabric. In various embodiments of the disclosure as described herein, an oil treat rate of the fabric is at least 0.05 g of oil per kg of fabric, e.g., in the range of 0.05-2.5 g per kg of fabric, or 0.05-1.5 g per kg of fabric, or 0.05-1 g per kg of fabric, or 0.05-0.5 g per kg of fabric. In various embodiments of the disclosure as described herein, an oil treat rate of the fabric is at least 0.15 g of the oil per kg of the fabric, e.g., in the range of 0.15-2.5 g per kg of fabric, or 0.15-1.5 g per kg of fabric, or 0.15-1 g per kg of fabric, or 0.15-0.5 g per kg of fabric. For example, in some embodiments, an oil treat rate of the fabric is at least 0.25 g of the oil per kg of fabric, e.g., in the range of 0.25-2.5 g per kg of fabric, or 0.25-1.5 g per kg of fabric, or 0.25-1 g per kg of fabric, or 0.25-0.5 g per kg of fabric.

The fabric softener compositions described herein can be used after the fabric items are washed. As used herein, detergent is used to refer to compounds that are used to wash clothes (e.g., surfactants like anionic surfactants). In various embodiments as described herein, the softening operation is performed after the one or more fabric items are washed with a detergent. In some embodiments, the softening operation is performed after the one or more fabric items are washed with a detergent and after an initial water rinse is performed, as is typical in modern washing machines. As discussed above, the fabric softener compositions can be used with conventional washing machines. Conventional washing machines can be programmed to apply the fabric softener composition during a rinse cycle that occurs after a wash cycle with detergent (and typically after an initial rinse cycle to substantially remove detergent). In some embodiments, the softening operation is performed in a rinse cycle occurring after the washing with water of the one or more fabric items in a wash cycle.

Notably, the compositions and the processes of the disclosure need not provide a substantial amount of detergent in combination with the smectite clay. Accordingly, in various embodiments, the softening operations described herein are performed in the substantial absence of detergent (i.e., beyond any residual detergent that may remain after a detergent rinse step). In various embodiments, the compositions of the disclosure have a weight ratio of anionic surfactants to smectite clay of no more than 0.1:1, e.g., no more than 0.05:1, or no more than 0.02:1, or no more than 0.01:1.

Similarly, the compositions and processes of the disclosure need not provide a substantial amount of quaternary amine-bearing compounds in the softening operation. Accordingly, in various embodiments, the softening operation is performed in the substantial absence of quaternary amine-bearing compounds, e.g., wherein a weight ratio of quaternary amine-bearing compounds to smectite clay is no more than 0.1:1, e.g., no more than 0.05:1, or no more than 0.02:1, or no more than 0.01:1, or no more than 0.005:1, or no more than 0.002:1.

Similarly, the compositions and processes of the disclosure need not provide a substantial amount of polymeric amine-bearing compounds or polyamines in the softening operation. Accordingly, in various embodiments, the softening operation is performed in the substantial absence of polymeric amine-bearing compounds and polyamines, e.g., wherein a weight ratio of polymeric amine-bearing compounds and polyamines to smectite clay is no more than 0.1:1, e.g., no more than 0.05:1, or no more than 0.02:1, or no more than 0.01:1, or no more than 0.005:1, or no more than 0.002:1.

Similarly, the compositions and processes of the disclosure need not provide a substantial amount of polymeric flocculants in the softening operation. Accordingly, in various embodiments, the softening operation is performed in the substantial absence of flocculants, e.g., wherein a weight ratio of polymeric flocculants to smectite clay is no more than 2 wt %, e.g., no more than 0.5 wt %, or no more than 0.05 wt %, or no more than 0.005 wt %, or no more than 0.001 wt %, on a dry solids basis as measured with respect to the weight of the smectite clay. As described above, the presence of flocculants can be undesirable during the softening operation, as the flocculants can limit the spreadability of the smectite clay, thus reducing any softening affect.

Similarly, the compositions and the processes of the disclosure need not provide a substantial amount of polymeric components. Thus, in various embodiments, the softening operation is performed in the substantial absence of polymeric components, e.g., wherein a weight ratio of polymeric components to smectite clay is no more than 0.1:1, e.g., no more than 0.05:1, or no more than 0.02:1, or no more than 0.01:1.

The softening operation can be used to treat a variety of fabric materials. For example, cellulosic fabrics (e.g., cotton fabrics) can be treated without decreasing their water absorbing properties. Other fabrics made from synthetic fibers, such as polyester, nylon, and acrylic, as well as blends with other natural or synthetic fibers thereof, can also be treated under the softening operation described herein. In various embodiments of the disclosure as described herein, the fabric items are made from a material selected from the group consisting of polyester, nylon, acrylic, cotton, and combinations thereof. Indeed, the present inventor has noted that a blend of fabrics comprising of synthetics such as polyester, polyester cotton blend, nylon and acrylic and cotton when treated with the present invention and tumble dried did not exhibit crackling sound or clinging when retrieved from the tumble dryer one by one.

EXAMPLES

The Examples that illustrative of specific embodiments of the compositions of the disclosure, and various uses thereof. They are set forth for explanatory purposes only, and are not to be taken as limiting the scope of the disclosure.

Example 1. Smectite Clay Materials

Various fabric softener compositions were prepared using the montmorillonite clays described in Table 1 below. The mineralogy of each montmorillonite clay is broken down by the weight percentage of each element.

TABLE 1

| | Clay 1 | Clay 2 | Clay 3 | Clay 4 | Clay 5 |
|---|---|---|---|---|---|
| O | 50.71% | 48.96% | 48.26% | 56.53% | 49.09% |
| Si | 36.22% | 33.27% | 31.73% | 34.98% | 32.14% |
| Al | 7.87% | 7.51% | 8.47% | 4.69% | 7.98% |
| Ca | 0.76% | 7.51% | 1.97% | 1.54% | 4.75% |
| Cl | 0.23% | — | — | — | 0.06% |
| Cr | 0.01% | — | — | — | 0.01% |
| Fe | 0.69% | 1.09% | 3.17% | 0.83% | 1.02% |
| K | 0.67% | 0.65% | 3.39% | 0.18% | 0.28% |
| Mg | 2.15% | 1.55% | 2.20% | 0.80% | 4.21% |
| Mn | 0.02% | — | — | — | 0.03% |
| Na | 0.58% | 0.58% | 0.82% | 0.42% | 0.35% |
| Ti | — | — | — | 0.04% | 0.06% |

Example 2. Preparation of Fabric Softener Compositions

The various fabric softener compositions shown below in Table 2 were prepared using the following general procedure. Montmorillonite clay, sodium chloride, and a portion of water were combined and milled in a Waring Blender to provide a slurry. Tomamine® E-14-2 and a portion of the mineral oil were added to the slurry. Only a portion of the mineral oil is initially added to ensure the deposition of E-14-2 onto the montmorillonite clay. After a period of mixing, the rest of the mineral oil is added to the fabric softener, and sufficient water is added to provide a 30 g dose of a fabric softener composition.

Example 3. Fabric Softener Compositions and Softening Operations

The nine fabric softener compositions shown in Table 2 below were prepared according to the procedure described in Example 2.

TABLE 2

| Fabric Softener | Clay Type | Clay (g) | E-14-2 (g) | NaCl (g) | Mineral Oil (g) | Water (g) | Dispensing Mode |
|---|---|---|---|---|---|---|---|
| 1 | Clay 1 | 4.500 | 1.021 | 0.429 | 0.741 | 23.309 | Manual |
| 2 | Clay 3 | 4.500 | 1.021 | 0.657 | 0.751 | 23.071 | Manual |
| 3 | Clay 2 | 4.250 | 1.021 | 0.668 | 0.741 | 23.320 | Manual |
| 4 | Clay 3 | 4.725 | 1.072 | 0.680 | 0.805 | 22.718 | Machine Direct |
| 5 | Clay 1 | 4.500 | 1.021 | 0.429 | 0.741 | 23.309 | Machine Direct |
| 6 | Clay 4 | 5.060 | 1.045 | 0.677 | 0.855 | 22.363 | Machine Direct |
| 7 | Clay 2 | 4.680 | 1.123 | 0.757 | 0.819 | 22.621 | Machine Direct |
| 8 | Clay 4 | 4.600 | 0.950 | 0.616 | 0.611 | 23.223 | Manual |
| 9 | Clay 5 | 4.950 | 1.123 | 0.455 | 0.819 | 22.653 | Machine Direct |

These 9 fabric softener compositions were used to soften fabric items. In these tests, the fabric items were a combination of swatches and hand towels. In order to remove any mill chemicals or residual softeners from previous tests, all of the fabric items were pre-washed multiple times with a commercially available fragrance-free detergent such as Tide Free & Gentle™, followed by multiple washes without detergent. The fabric items were pre-washed in the same load to ensure that the fabrics were uniformly treated prior to testing.

For fabric softeners 1-3 and 8, the fabric softeners were dispensed manually into the washing machine. After the pre-washing described above, the test fabrics required for the trial according to the number of softeners to be tested were loaded into the washing machine and an appropriate amount of fragrance-free detergent according to the instructions on the detergent packaging was added. The washing machine was started and allowed to run through the detergent wash cycle and the first water rinse cycle. The washing machine was stopped before the softener cycle is started. The wet fabrics were removed and split evenly into a test batch (i.e., to be treated with a fabric softener composition) and a control batch (i.e., to be treated with just water or commercially available liquid fabric softener). The washing machine was set to a rinse/spin cycle. After the washing machine filled to a predetermined level, the fabric softener was manually added and mixed by hand, followed by the addition of the test batch of 2.3-2.4 kg of wet fabrics, on a dry weight basis. The rinse/spin cycle was carried out, followed by a spin-dry cycle. The spin-dried fabrics were then removed from the washing machine and dried.

For fabric softeners 4-7 and 9, the fabric softener compositions were dispensed by the washing machine directly. After the pre-washing described above, the test fabrics were dried and split evenly for the number of softeners to be tested. The 2.5-2.7 kg of test fabrics, on a dry fabric basis, designated for the softener to be tested were loaded into the washing machine. An appropriate amount of fragrance-free detergent according to the instructions on the detergent packaging was added to the shelf designated for the detergent, and 30 g of fabric softener was added to the shelf designated for the fabric softener. The machine was then allowed to run through the wash and rinse cycle wherein the machine dispensed the detergent during the wash cycle and the softener dispensed during a subsequent treatment cycle, followed by a spin-dry cycle. The spin-dried fabrics were then removed from the washing machine and dried.

For each fabric softener test, the test and control fabrics were conditioned overnight under the same conditions, at a relative humidity in the range of 45-60% and a temperature in the range of 20-24° C. in accordance with ASTM D5237.

The test fabrics and control fabrics for each fabric softener composition were compared in a blind test. In all cases, the test fabrics were softer to the touch compared to the control fabrics that were not treated with fabric softener. The softness of the test fabrics were also comparable to fabrics treated using commercially available liquid fabric softener products under similar conditions. The treated fabrics did not exhibit any clinging (e.g., to other fabrics or to skin) or crackling noises due to static. The softeners were equally effective regardless of if the fabric softener was dispensed manually or directly by the machine (see, e.g., fabric softeners 1 and 5).

Example 4. Comparative Tests with Mineral Oil

Comparative tests to determine the effects of the mineral oil were performed using various comparative softener prepared according to the composition of fabric softener 9 in Example 3. These comparative softeners are summarized in Table 3 below:

TABLE 3

| Comparative Softener | Clay 5 (g) | E-14-2 (g) | NaCl (g) | Mineral Oil (g) | Water (g) |
|---|---|---|---|---|---|
| 1 | 4.950 | — | 0.455 | — | 24.595 |
| 2 | 4.950 | 1.123 | 0.455 | — | 23.472 |
| 3 | 4.950 | 1.123 | 0.455 | 0.819 | 22.653 |

For each of comparative softener 1-3, four lots of test swatches with different roughness and hand towels were tested according to the test procedure described in Example 3. The test swatches and hand towels treated with comparative softener 1 exhibited the least softness. The test swatches treated with comparative softener 2 had softness reasonably comparable to test swatches treated with commercial fabric softener. The hand towels treated with comparative softener 2 were softer than those treated with comparative softener 1 but not as soft as the towels treated with commercial fabric softener. Both the test swatches and hand towels treated with comparative softener 3 were softer than those with comparative softener 2, were described to have a silky feel, and had softness easily comparable to test swatches and hand towels treated with commercial fabric softeners.

Example 5. Smectite Clay Dispersion

The present inventor has noted the desirability of a high degree of clay dispersion, such that the clay is in the water used to treat fabric as finely divided particles, without substantial clumping or flocculation.

To observe the suspended particles and the degree of clay deposition, the following experiment was performed: The washing machine was filled to the desired level with rinse water, and a smectite-clay based fabric softener as described herein was mixed in the water. The fabric softener was dispersed in the washing machine by running the agitator for a few minutes. A 10 oz sample of the rinse water is collected, filtered through a 500 mesh screen and saved in a transparent plastic cup before the previously wetted fabrics are introduced into the rinse water. It was observed that none of the clay particles were retained on the screen. The wetted fabrics charged had been put through a detergent treatment cycle and an initial rinse cycle, to provide conditions similar to those when the fabric softener is dispensed directly by the machine. After the softener rinse cycle is completed, the machine is stopped to prevent the rinse water from draining and a second water sample equal in size to the first sample is collected and filtered through the 500 mesh screen. Some fiber particles that dislodge from the fabrics during the softener treatment process get filtered out. Although some micro fiber particles still get through, screening out the larger fiber particles prevents their acting as seeds for any undeposited clay particles from dropping out of the rinse water sample and assists in the side by side comparison of the two wash water samples. It was observed that the water sample after fabric treatment is much clearer than the sample collected before fabric treatment.

It was also observed that the first of the wash water samples takes at least 30 minutes before noticeable sedimentation of particles at the bottom of the cup. When all the water from the pre-softener treatment sample is allowed to evaporate, the residual solids appear to be finely divided with no evidence of flocculation.

The long settling time is indicative of the presence of clay as microparticles, enabling the softener to be distributed and deposited uniformly throughout the fabric and imparting a uniform feeling of softness to the entire surface of the dried fabrics.

Various aspects of the disclosure are illustrated by the following enumerated embodiments, which may be combined in any number and in any combination not technically or logically inconsistent:

Embodiment 1. A fabric softener composition comprising:
- a smectite clay;
- a non-polymeric amine component selected from the group consisting of primary amines, secondary amines, and tertiary amines;
- a water-soluble metal halide or sulfate; and
- optionally, an oil selected from the group consisting of a mineral oil and a vegetable oil.

Embodiment 2. The composition of embodiment 1, wherein the smectite clay comprises (or is) a bentonite clay.

Embodiment 3. The composition of embodiment 1, wherein the smectite clay comprises (or is) a montmorillonite clay.

Embodiment 4. The composition of embodiment 1, wherein the smectite clay comprises (or is) a hectorite clay.

Embodiment 5. The composition of any of embodiments 1-4, wherein the smectite clay is present in an amount in the range of 5-90 wt %, on a dry solids basis.

Embodiment 6. The composition of any of embodiments 1-4, wherein the smectite clay is present in an amount in the range of 20-90 wt %, e.g., 20-75 wt %, or 20-60 wt %, or 20-50 wt %, or 20-40 wt %, on a dry solids basis.

Embodiment 7. The composition of any of embodiments 1-4, wherein the smectite clay is present in an amount in the range of 25-90 wt %, e.g., 25-80 wt %, or 25-70 wt %, or 25-60 wt %, or 25-50 wt %, or 25-40 wt %, on a dry solids basis.

Embodiment 8. The composition of any of embodiments 1-4, wherein the smectite clay is present in an amount in the range of 30-90 wt %, e.g., 30-80 wt %, or 30-70 wt %, or 30-60 wt %, or 30-50 wt %, on a dry solids basis.

Embodiment 9. The composition of any of embodiments 1-4, wherein the smectite clay is present in an amount in the range of 40-90 wt %, e.g., 40-80 wt %, or 40-70 wt %, or 40-60 wt %, on a dry solids basis.

Embodiment 10. The composition of any of embodiments 1-4, wherein the smectite clay is present in an amount in the range of 50-90 wt %, e.g., 50-80 wt %, or 50-70 wt %, on a dry solids basis.

Embodiment 11. The composition of any of embodiments 1-10, wherein the non-polymeric amine component includes (or is) one or more of a secondary amine and a tertiary amine.

Embodiment 12. The composition of any of embodiments 1-10, wherein the non-polymeric amine component includes (or is) a tertiary amine.

Embodiment 13. The composition of any of embodiments 1-12, wherein the non-polymeric amine component includes (or is) an amine having at least one electron-withdrawing group bound to an amine nitrogen atom thereof.

Embodiment 14. The composition of embodiment 13, wherein the at least one electron-withdrawing group comprises at least one atom having a Pauling electronegativity of at least 3.2 (e.g., at least 3.3, or at least 3.4) that is not directly bound to the amine.

Embodiment 15. The composition of embodiment 14, wherein the atom having a Pauling electronegativity of at least 3.2 is no more than 4 atoms away (e.g., no more than 3 atoms away, or no more than 2 atoms away) from the nitrogen atom.

Embodiment 16. The composition of any of embodiments 13-15, wherein the atom having a Pauling electronegativity of at least 3.2 is an oxygen atom.

Embodiment 17. The composition of any of embodiments 13-16, wherein the non-polymeric amine component has three of the electron-withdrawing group substituents.

Embodiment 18. The composition of any of embodiments 13-16, wherein the non-polymeric amine component has two of the electron-withdrawing group substituents.

Embodiment 19. The composition of any of embodiments 13-16, wherein the non-polymeric amine component has one of the electron-withdrawing group substituents.

Embodiment 20. The composition of any of embodiments 1-19, wherein the non-polymeric amine component includes (or is) an amine with one or more oxyalkyl groups bound thereto, e.g., one or more 2-oxyethyl groups or one or more 3-oxypropyl groups.

Embodiment 21. The composition of embodiment 20, wherein the one or more oxyalkyl groups are one or more hydroxyalkyl groups and/or one or more alkyloxyalkyl groups.

Embodiment 22. The composition of embodiment 20 or embodiment 21, wherein the one or more oxyalkyl groups are oxyethyl groups and/or oxypropyl groups, for example, oxyethyl groups.

Embodiment 23. The composition of embodiment 20, wherein one or more of the oxyalkyl groups have the structural formula $—(CH_2CH_2O)_xH$, wherein x has a weight-average value in the range of 1-10.

Embodiment 24. The composition of embodiment 23, wherein x has a weight-average value in the range of 1.8-10, e.g., in the range of 1.8-6, or in the range of 1.8-4, or in the range of 1.8-2.5.

Embodiment 25. The composition of embodiment 23, wherein x has a weight-average value in the range of 4-10, e.g., in the range of 4-6.

Embodiment 26. The composition of any of embodiments 1-25, wherein the non-polymeric amine component includes (or is) an etheramine.

Embodiment 27. The composition of embodiment 26, wherein the etheramine comprises a substituent on nitrogen having the structural formula $R_1—O—(CH_2)_{2-3}—$, in which $R_1$ is an aliphatic branched or straight-chain hydrocarbyl group having a weight-average number of carbons in the range of 8-16, Embodiment 28. The composition of embodiment 26, wherein the non-polymeric amine component has the structural formula (I)

(I)

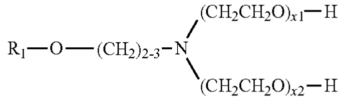

in which $R_1$ is an aliphatic branched or straight-chain hydrocarbyl group having a weight-average number of carbons in the range of 8-16 (e.g., in the range of 8-12), and the of sum x1 and x2 has a weight-average value in the range of 1-10.

Embodiment 29. The composition of embodiment 28, wherein $R_1$ is an aliphatic branched or straight-chain hydrocarbyl group having a weight-average number of carbons of about 10 or about 13

Embodiment 30. The composition of embodiment 28, wherein the sum of x1 and x2 has a weight-average value in the range of 1.8-10, e.g., in the range of 1.8-6, or in the range of 1.8-4, or in the range of 1.8-2.5.

Embodiment 31. The composition of embodiment 28, wherein the sum of x1 and x2 has a weight-average value in the range of 4-10, e.g., in the range of 4-6.

Embodiment 32. The composition of any of embodiments 28-31, wherein $R^1$ is branched, e.g., iso-branched.

Embodiment 33. The composition of any of embodiments 28-31, wherein $R^1$ is branched decyl (e.g., isodecyl) or branched tridecyl (e.g., isotridecyl).

Embodiment 34. The composition of embodiment 28, wherein the non-polymeric amine component includes (or is) one or more of poly (2) oxyethylene isodecyloxypropylamine, poly (5) oxyethylene isodecyloxypropylamine, poly (2) oxyethylene isotridecyl-oxypropylamine, and poly (5) oxyethylene isotridecyloxypropylamine.

Embodiment 35. The composition of embodiment 28, wherein the non-polymeric amine component includes (or is) poly (2) oxyethylene isodecyloxypropylamine.

Embodiment 36. The composition of embodiment 28 or embodiment 29, wherein the non-polymeric amine component includes (or is) poly (5) oxyethylene isodecyloxypropylamine.

Embodiment 37. The composition of embodiment 26, wherein the etheramine has the formula $R_1$—O—$(CH_2)_{2-3}$—NH2, wherein $R^1$ is as described above in any of the above embodiments.

Embodiment 38. The composition of embodiment 37, wherein the etheramine is in the form of an acetic acid salt.

Embodiment 39. The composition of embodiment 26, wherein the etheramine is isodecyloxypropylammonium acetate or isotridecyloxypropylammonium acetate.

Embodiment 40. The composition of any of embodiments 1-39, having no more than 1 wt % of hydrocarbyl amines having amine-bound hydrocarbyl groups of 8 or more carbons, on a dry solids basis.

Embodiment 41. The composition of any of embodiments 1-40, wherein the non-polymeric amine component is present in an amount of at least 1 wt %, e.g., at least 2 wt %, or at least 5 wt %, or at least 10 wt %, or at least 20 wt %, on a dry solids basis.

Embodiment 42. The composition of any of embodiments 1-40, wherein the non-polymeric amine component is present in an amount in the range of 1-75 wt %, on a dry solids basis.

Embodiment 43. The composition of any of embodiments 1-40, wherein the non-polymeric amine component is present in an amount in the range of 1-50 wt %, e.g., in the range of 1-40 wt %, or 1-30 wt %, or in the range of 1-20 wt %, or in the range of 1-10 wt %, on a dry solids basis.

Embodiment 44. The composition of any of embodiments 1-40, wherein the non-polymeric amine component is present in an amount in the range of 2-75 wt %, e.g., in the range of 2-50 wt %, or 2-40 wt %, e.g., in the range of 2-30 wt %, or in the range of 2-20 wt %, or in the range of 2-10 wt %, on a dry solids basis.

Embodiment 45. The composition of any of embodiments 1-40, wherein the non-polymeric amine component is present in an amount in the range of 5-75 wt %, e.g., in the range of 5-50 wt %, or 5-40 wt %, or in the range of 5-30 wt %, or in the range of 5-20 wt %, or in the range of 5-10 wt %, on a dry solids basis.

Embodiment 46. The composition of any of embodiments 1-40, wherein the non-polymeric amine component is present in an amount in the range of 10-75 wt %, e.g., in the range of 10-50 wt %, or 10-40 wt %, or in the range of 10-30 wt %, or in the range of 10-20 wt %, on a dry solids basis.

Embodiment 47. The composition of any of embodiments 1-46, wherein a weight ratio of the smectite clay to the non-polymeric amine component is in the range of 0.2:1 to 10:1, e.g., in the range of 1:1 to 10:1, or 2:1 to 10:1, or in the range of 3:1 to 10:1.

Embodiment 48. The composition of any of embodiments 1-46, wherein a weight ratio of the smectite clay to non-the polymeric amine component is in the range of 0.2:1 to 8:1, e.g., in the range of 1:1 to 8:1, or 2:1 to 8:1, or in the range of 3:1 to 8:1.

Embodiment 49. The composition of any of embodiments 1-46, wherein a weight ratio of the smectite clay to the non-polymeric amine component is in the range of 0.2:1 to 6:1, e.g., in the range of 1:1 to 6:1, or 2:1 to 6:1, or in the range of 3:1 to 6:1.

Embodiment 50. The composition of any of embodiments 1-49, wherein the metal ion of the water-soluble metal halide, sulfate comprises (or is) an alkali metal ion or alkaline earth metal ion.

Embodiment 51. The composition of any of embodiments 1-50, wherein the water-soluble metal halide or sulfate comprises (or is) a sodium salt, a potassium salt, a calcium salt, or a magnesium salt.

Embodiment 52. The composition of any of embodiments 1-51, wherein the water-soluble metal halide or sulfate comprises (or is) a halide (e.g., a chloride).

Embodiment 53. The composition of any of embodiments 1-51, wherein the water-soluble metal halide or sulfate comprises (or is) a sulfate.

Embodiment 54. The composition of any of embodiments 1-49, wherein the water-soluble metal halide or sulfate comprises (or is) sodium chloride or sodium sulfate, e.g., sodium chloride Embodiment 55. The composition of any of embodiments 1-54, wherein the water-soluble metal halide or sulfate is present in an in the range of 0.1-10 wt %, e.g., 0.1-7.5 wt %, or 0.1-5 wt %, of the composition.

Embodiment 56. The composition of any of embodiments 1-54, wherein the water-soluble metal halide or sulfate is present in an amount in the range of 0.2-10 wt %, e.g., 0.2-10 wt %, or 0.2-7.5 wt %, or 0.2-5 wt %, of the composition.

Embodiment 57. The composition of any of embodiments 1-54, wherein the water-soluble metal halide or sulfate is present in an amount in the range of 0.5-10 wt %, e.g., 0.5-7.5 wt %, or 0.5-5 wt %, of the composition.

Embodiment 58. The composition of any of embodiments 1-54, wherein the water-soluble metal halide or sulfate is present in an amount in the range of 1-3 wt %, of the composition.

Embodiment 59. The composition of any of embodiments 1-58, wherein a weight ratio of the water-soluble metal halide or sulfate to the smectite clay is in the range of 0.01:1 to 0.5:1, e.g., in the range of 0.01:1 to 0.4:1, or in the range of 0.01:1 to 0.3:1, or in the range of 0.01:1 to 0.2:1.

Embodiment 60. The composition of any of embodiments 1-58, wherein a weight ratio of the water-soluble metal halide or sulfate to the smectite clay is in the range of 0.05:1 to 0.5:1, e.g. in the range of 0.05:1 to 0.4:1, or in the range of 0.05:1 to 0.3:1, or in the range of 0.05:1 to 0.2:1.

Embodiment 61. The composition of any of embodiments 1-60, wherein the oil is present.

Embodiment 62. The composition of embodiment 61, wherein the oil includes (or is) a mineral oil.

Embodiment 63. The composition of embodiment 61, wherein the oil includes (or is) a vegetable oil.

Embodiment 64. The composition of any of embodiments 61-63, wherein the oil is present in an amount up to 25 wt %, e.g., up to 20 wt %, or up to 15 wt %.

Embodiment 65. The composition of any of embodiments 61-63, wherein the oil is present in an amount in the range of 0.5-25 wt %, e.g., in the range of 0.5-20 wt %, or in the range of 0.5-15 wt %, on a dry solids basis.

Embodiment 66. The composition of any of embodiments 61-63, wherein the oil is present in an amount in the range of 1-25 wt %, e.g., in the range of 1-20 wt %, or in the range of 1-15 wt %, on a dry solids basis.

Embodiment 67. The composition of any of embodiments 61-63, wherein the oil is present in an amount in the range of 2-25 wt %, e.g., in the range of 2-20 wt %, or in the range of 2-15 wt %, on a dry solids basis.

Embodiment 68. The composition of any of embodiments 61-63, wherein the oil is present in an amount in the range of 5-25 wt %, e.g., in the range of 5-20 wt %, or in the range of 5-15 wt %, on a dry solids basis.

Embodiment 69. The composition of any of embodiments 61-68, wherein a weight ratio of the oil to the non-polymeric amine component is in the range of 0.05:1 to 1.5:1, e.g., in the range of 0.05:1 to 1.2:1, or 0.5:1 to 1:1.

Embodiment 70. The composition of any of embodiments 61-68, wherein a weight ratio of the oil to the non-polymeric amine component is in the range of 0.1:1 to 1.5:1, e.g. in the range of 0.1:1 to 1.2:1, or 0.1:1 to 1:1.

Embodiment 71. The composition of any of embodiments 61-68, wherein a weight ratio of the oil to the non-polymeric amine component is in the range of 0.2:1 to 1.5:1, e.g., in the range of 0.2:1 to 1.2:1, or in the range of 0.2:1 to 1:1, or in the range of 0.3:1 to 0.8:1, or in the range of 0.4:1 to 0.8:1, or in the range of 0.6:1 to 0.8:1.

Embodiment 72 The composition of any of embodiments 1-71, having a total organic content of no more than 10 wt % of the total composition weight, e.g., no more than 5 wt %.

Embodiment 73. The composition of any of embodiments 1-72, having no more than 50 wt % organic content on a dry solids basis, e.g., no more than 30 wt %, or no more than 20 wt %.

Embodiment 74. The composition of any of embodiments 1-73, further comprising one or more additional components selected from fragrances, tint, and biocides.

Embodiment 75. The composition of any of embodiments 1-74, having no more than 5 wt % of quaternary amine-bearing compounds, e.g., no more than 2 wt %, or no more than 1 wt %, or no more than 0.5 wt %, on a dry solids basis.

Embodiment 76. The composition of any of embodiments 1-74, having no more than 0.1 wt % of quaternary amine-bearing compounds, e.g., no more than 0.05 wt %, or no more than 0.01 wt %, or no more than 0.005 wt %, or no more than 0.002 wt %, on a dry solids basis.

Embodiment 77. The composition of any of embodiments 1-75, having substantially no quaternary amine-bearing compounds.

Embodiment 78. The composition of any of embodiments 1-77, having no more than 2 wt % of polymeric amine-bearing compounds and/or polyamine compounds, e.g., no more than 1 wt %, or no more than 0.5 wt %, or no more than 0.2 wt %, on a dry solids basis.

Embodiment 79. The composition of any of embodiments 1-77, having substantially no polymeric amine-bearing compounds and/or polyamine compounds.

Embodiment 80. The composition of any of embodiments 1-79, having no more than 2 wt % of polymeric flocculants, e.g., no more than 0.5 wt %, or no more than 0.05 wt %, or no more than 0.005 wt %, or no more than 0.001 wt %, on a dry solids basis as measured with respect to the weight of the smectite clay.

Embodiment 81. The composition of any of embodiments 1-80, having no more than 2 wt % of polymeric components, e.g., no more than 1 wt %, or no more than 0.5 wt %, or no more than 0.2 wt %, on a dry solids basis, or having substantially no polymeric components.

Embodiment 82. The composition of any of embodiments 1-81, having a weight ratio of anionic surfactants to smectite clay of no more than 0.1:1, e.g., no more than 0.05:1, or no more than 0.02:1, or no more than 0.01:1.

Embodiment 83. A composition of any of embodiments 1-82, in a substantially liquid form Embodiment 84. A composition according to embodiment 83, further comprising water.

Embodiment 85. The composition of embodiment 84, wherein water is present in an amount up to 1000 wt % on a dry solids basis, e.g., up to 800 wt %, or up to 600 wt %, or up to 300 wt % (i.e., taking the total amount of dry solids as 100 wt %).

Embodiment 86. A composition according to embodiment 84 or embodiment 85, wherein water is present in an amount sufficient to provide a dose of the fabric softener composition of about 30 g of the fabric softener composition for a load of laundry in the range of 2.5-3.0 kg, based on dry fabric weight.

Embodiment 87. The composition of any of embodiments 83-86, wherein the composition is in liquid form and no oil sheen is observed on a liquid surface of the composition.

Embodiment 88. A composition according to any of embodiments 1-82, in a substantially solid form, e.g., in a powder form, a granular form, pellet form or tablet form Embodiment 89. A process for treating fabric comprising:

contacting a composition according to any of embodiments 1-88 and one or more fabric items in water; and isolating the one or more fabric items from the water.

Embodiment 90. A process for treating fabric comprising a softening operation comprising contacting in water one or more fabric items with a smectite clay;

a non-polymeric amine component selected from the group consisting of primary amines, secondary amines, and tertiary amines;

a water-soluble metal halide or sulfate; and optionally, an oil selected from the group consisting of a mineral oil and a vegetable oil; and isolating the one or more fabric items from the water.

Embodiment 91. The process of embodiment 90, wherein each of the smectite clay, the non-polymeric amine component, the water-soluble metal halide or sulfate, and the oil is as described in any embodiment above.

Embodiment 92. The process of any of embodiments 89-91, wherein a smectite clay treat rate of the fabric is at least 0.5 g smectite clay per kg fabric, e.g., in the range of 0.5-10 g per kg fabric, or in the range of 0.5-5 g per kg fabric, or in the range of 0.5-4 g per kg fabric, or in the range of 0.5-3 g per kg fabric.

Embodiment 93. The process of any of embodiments 89-91, wherein a smectite clay treat rate of the fabric is at least 1 g smectite clay per kg fabric, e.g., in the range of 1-10 g per kg fabric, or in the range of 1-5 g per kg fabric, or in the range of 1-4 g per kg fabric, or in the range of 1-3 g per kg fabric.

Embodiment 94. The process of any of embodiments 89-91, wherein a smectite clay treat rate of the fabric is at least 1.5 g smectite clay per kg fabric, e.g., in the range of 1.5-10 g per kg fabric, or in the range of 1.5-5 g per kg fabric, or in the range of 1.5-4 g per kg fabric, or in the range of 1.5-3 g per kg fabric.

Embodiment 95. The process of any of embodiments 89-91, wherein a smectite clay treat rate of the fabric is at least 2 g smectite clay per kg fabric, e.g., in the range of 2-10 g per kg fabric, or in the range of 2-5 g per kg fabric, or in the range of 2-4 g per kg fabric, or in the range of 2-3 g per kg fabric.

Embodiment 96. The process of any of embodiments 89-95, wherein a non-polymeric amine component treat rate of the fabric is at least 0.05 g non-polymeric amine component per kg fabric, e.g., in the range of 0.05-5 g per kg fabric, or in the range of 0.05-2.5 g per kg fabric, or in the range of 0.05-2 g per kg fabric, or in the range of 0.05-1 g per kg fabric.

Embodiment 97. The process of any of embodiments 89-95, wherein a non-polymeric amine component treat rate of the fabric is at least 0.15 g non-polymeric amine component per kg fabric, e.g., in the range of 0.15-5 g per kg fabric, or in the range of 0.15-2.5 g per kg fabric, or in the range of 0.15-2 g per kg fabric, or in the range of 0.15-1 g per kg fabric.

Embodiment 98. The process of any of embodiments 89-95, wherein a non-polymeric amine component treat rate of the fabric is at least 0.25 g non-polymeric amine component per kg fabric, e.g., in the range of 0.25-5 g per kg fabric, or in the range of 0.25-2.5 g per kg fabric, or in the range of 0.25-2 g per kg fabric, or in the range of 0.25-1 g per kg fabric.

Embodiment 99. The process of any of embodiments 89-98, wherein an oil treat rate of the fabric is up 2.5 g oil per kg fabric, e.g., up to 1.5 g per kg fabric, or up to 1.0 g per kg fabric, or up to 0.5 g per kg fabric.

Embodiment 100. The process of any of embodiments 89-98, wherein an oil treat rate of the fabric is at least 0.05 g oil per kg fabric, e.g., in the range of 0.05-2.5 g per kg fabric, or in the range of 0.05-1.5 g per kg fabric, or in the range of 0.05-1 g, or in the range of 0.05-0.5 g per kg fabric.

Embodiment 101. The process of any of embodiments 89-98, wherein an oil treat rate of the fabric is at least 0.05 g oil per kg fabric, e.g., in the range of 0.15-2.5 g per kg fabric, or in the range of 0.15-1.5 g per kg fabric, or in the range of 0.15-1 g per kg fabric, or in the range of 0.15-0.5 g per kg fabric.

Embodiment 102. The process of any of embodiments 89-98, wherein an oil treat rate of the fabric is at least 0.05 g oil per kg fabric, e.g., in the range of 0.25-2.5 g per kg fabric, or in the range of 0.25-1.5 g per kg fabric, or in the range of 0.25-1 g per kg fabric, or in the range of 0.25-0.5 g per kg fabric.

Embodiment 103. The process of any of embodiments 89-102, wherein a water-soluble metal halide or sulfate treat rate is up to 1.25 g water-soluble metal halide or sulfate per kg of fabric, e.g., up to 1 g per kg fabric, or up to 0.75 g per kg fabric, or up to 0.5 g per kg fabric.

Embodiment 104. The process of any of embodiments 89-103, wherein a water-soluble metal halide or sulfate treat rate is at least 0.05 g water-soluble metal halide or sulfate per kg of fabric, e.g., in the range of 0.05-1.25 g per kg fabric, or in the range of 0.05-1 g per kg fabric, or in the range of 0.05-0.75 g per kg fabric, or in the range of 0.05-0.5 g per kg fabric.

Embodiment 105. The process of any of embodiments 89-103, wherein a water-soluble metal halide or sulfate treat rate is at least 0.1 g water-soluble metal halide or sulfate per kg of fabric, e.g., in the range of 0.1-1.25 g per kg fabric, or in the range of 0.1-1 g per kg fabric, or in the range of 0.1-0.75 g per kg fabric, or in the range of 0.1-0.5 g per kg fabric.

Embodiment 106. The process of any of embodiments 89-103, wherein a water-soluble metal halide or sulfate treat rate is at least 0.2 g water-soluble metal halide or sulfate per kg of fabric, e.g., in the range of 0.2-1.25 g kg of fabric, or in the range of 0.2-1 g kg of fabric, or in the range of 0.2-0.75 g kg of fabric, or in the range of 0.2-0.5 g kg of fabric.

Embodiment 107. The process of any of embodiments 89-106, performed in the substantial absence of quaternary amine-bearing compounds, e.g., wherein a weight ratio of quaternary amine-bearing compounds to smectite clay is no more than 0.1:1, e.g., no more than 0.05:1, or no more than 0.02:1, or no more than 0.01:1, or no more than 0.005:1, or no more than 0.002:1.

Embodiment 108. The process of any of embodiments 89-107, performed in the substantial absence of polymeric amine-bearing compounds and polyamines, e.g., wherein a weight ratio of polymeric amine-bearing compounds and polyamines to smectite clay is no more than 0.1:1, e.g., no more than 0.05:1, or no more than 0.02:1, or no more than 0.01:1, or no more than 0.005:1, or no more than 0.002:1.

Embodiment 109. The process of any of embodiments 89-108, performed in the substantial absence of polymeric flocculants, e.g., wherein a weight ratio of polymeric flocculants to smectite clay is no more than no more than 2 wt %, e.g., no more than 0.5 wt %, or no more than 0.05 wt %, or no more than 0.005 wt %, or no more than 0.001 wt %, on a dry solids basis as measured with respect to the weight of the smectite clay.

Embodiment 110. The process of any of embodiments 89-109, performed in the substantial absence of polymeric components, e.g., wherein a weight ratio of polymeric components to smectite clay is no more than 0.1:1, e.g., no more than 0.05:1, or no more than 0.02:1, or no more than 0.01:1.

Embodiment 111. The process of any of embodiments 89-110, wherein the softening operation is performed after the fabric is washed with a detergent.

Embodiment 112. The process of embodiment 111, wherein the fabric has undergone an initial rinse to substantially remove detergent after the washing with the detergent and before the softening operation.

Embodiment 113. The process of embodiment 111 or 112, wherein the softening operation is performed in a rinse cycle occurring after the washing of the fabric in a wash cycle.

Embodiment 114. The process of any of embodiments 89-113, wherein the fabric is made from a material selected from the group consisting of polyester, nylon, acrylic, cotton, and combinations thereof.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice. Thus, before the disclosed processes and devices are described, it is to be understood that the aspects described herein are not limited to specific embodiments, apparatuses, or configurations, and as such can, of course, vary. It is also to be understood that the terminology used herein is for the purpose of describing particular aspects only and, unless specifically defined herein, is not intended to be limiting.

The terms "a," "an," "the" and similar referents used in the context of describing the invention (especially in the context of the following embodiments) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. It will be further understood that the endpoints of each of the ranges are significant both in relation to the other endpoint, and independently of the other endpoint.

All methods described herein can be performed in any suitable order of steps unless otherwise indicated herein or otherwise clearly contradicted by context. The use of any and all examples, or exemplary language (e.g., "such as") provided herein is intended merely to better illuminate the invention and does not pose a limitation on the scope of the invention otherwise described. No language in the specification should be construed as indicating any non-described element essential to the practice of the invention.

Unless the context clearly requires otherwise, throughout the description and the embodiments, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

As will be understood by one of ordinary skill in the art, each embodiment disclosed herein can comprise, consist essentially of or consist of its particular stated element, step, ingredient or component. As used herein, the transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment.

Unless indicated to the contrary, the numerical parameters set forth in the specification and attached embodiments are approximations that may vary depending upon the desired properties sought to be obtained by the present invention. At the very least, and not as an attempt to limit the application of the doctrine of equivalents to the scope of the embodiments, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Groupings of alternative elements or embodiments of the invention disclosed herein are not to be construed as limitations. Each group member may be referred to and described individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended embodiments.

Some embodiments of this invention are described herein, including the best mode known to the inventor for carrying out the invention. Of course, variations on these described embodiments will become apparent to those of ordinary skill in the art upon reading the foregoing description. The inventor expects skilled artisans to employ such variations as appropriate, and the inventor intends for the invention to be practiced otherwise than specifically described herein. Accordingly, this invention includes all modifications and equivalents of the subject matter recited in the embodiments appended hereto as permitted by applicable law. Moreover, any combination of the above-described elements in all possible variations thereof is encompassed by the invention unless otherwise indicated herein or otherwise clearly contradicted by context.

Furthermore, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

I claim:

1. A fabric softener composition comprising:

A) a smectite clay;

B) a non-polymeric amine component according to the formula (I)

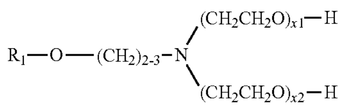

(I)

in which $R_1$ is an aliphatic branched or straight-chain hydrocarbyl group having a weight-average number of carbons in the range of 8-16 and the of sum x1 and x2 has a weight-average value in the range of 1.8-10;

C) a water-soluble metal halide or sulfate; and

D) optionally, an oil selected from the group consisting of a mineral oil and a vegetable oil.

2. The composition of claim 1, wherein the smectite clay is present in an amount in the range of 25-80 wt %, on a dry solids basis; and the non-polymeric amine component is present in an amount in the range of 5-50 wt %, on a dry solids basis.

3. The composition of claim 1, wherein a weight ratio of the smectite clay to the non-polymeric amine component is in the range of 1:1 to 8:1.

4. The composition of claim 1, wherein the water-soluble metal halide or sulfate comprises sodium chloride or sodium sulfate.

5. The composition of claim 1, wherein the water-soluble metal halide or sulfate is present in an amount in the range of 0.1-10 wt % of the composition.

6. The composition of claim 1, wherein a weight ratio of the water-soluble metal halide or sulfate to the smectite clay is in the range of 0.05:1 to 0.3:1.

7. The composition of claim 1, wherein the oil is present in an amount in the range of 2-25 wt %, on a dry solids basis.

8. The composition of claim 7, wherein the oil includes a mineral oil.

9. The composition of claim 7, wherein a weight ratio of the oil to the non-polymeric amine component is in the range of 0.1:1 to 1.5:1.

10. The composition of claim 1, having no more than 0.1 wt % of quaternary amine-bearing compounds, on a dry solids basis.

11. A process for treating fabric comprising:

contacting a composition according to claim 1 and one or more fabric items in water; and isolating the one or more fabric items from the water.

12. A process for treating fabric comprising a softening operation, the softening operation being performed after the fabric is washed with a detergent and has undergone an initial rinse to substantially remove detergent after the washing with the detergent and before the softening operation, the softening operation comprising contacting in water one or more fabric items with the fabric softener composition of claim 1, and isolating the one or more fabric items from the water.

13. The composition of claim 1, wherein the smectite clay is present in an amount in the range of 25-80 wt %, on a dry solids basis;

the non-polymeric amine component is present in an amount in the range of 5-50 wt %, on a dry solids basis;

the water halide or sulfate is present in an in the range of 0.1-10 wt % of the composition; and the oil is present in an amount in the range of 2-25 wt %, on a dry solids basis.

14. The composition of claim 13, wherein a weight ratio of the water-soluble metal halide or sulfate to the smectite clay is in the range of 0.01:1 to 0.5:1.

15. The composition of claim 1, wherein the fabric softener composition further comprises water and is in the form of a liquid.

16. A fabric softener composition comprising:

A) a smectite clay;

B) a non-polymeric amine component according to the formula (I)

(I)

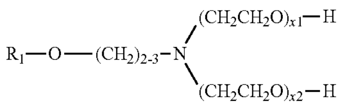

in which $R_1$ is an aliphatic branched or straight-chain hydrocarbyl group having a weight-average number of carbons in the range of 8-16 and the of sum x1 and x2 has a weight-average value in the range of 1.8-10;

C) a water-soluble metal halide or sulfate; and

D) an oil selected from the group consisting of a mineral oil and a vegetable oil, wherein the fabric softener composition further comprises water and the fabric softener composition is in the form of a liquid.

17. The composition of claim 16, having an amount of no more than 1 wt % of hydrocarbyl amines having amine-bound hydrocarbyl groups of 8 or more carbons, on a dry solids basis.

18. The composition of claim 16, wherein the smectite clay is present in an amount in the range of 25-80 wt %, on a dry solids basis;

the non-polymeric amine component is present in an amount in the range of 5-50 wt %, on a dry solids basis;

the water halide or sulfate is present in an in the range of 0.1-10 wt % of the composition; and the oil is present in an amount in the range of 2-25 wt %, on a dry solids basis.

19. The composition of claim 18, wherein a weight ratio of the water-soluble metal halide or sulfate to the smectite clay is in the range of 0.05:1 to 0.5:1; and a weight ratio of the smectite clay to the non-polymeric amine component is in the range of 1:1 to 8:1;

a weight ratio of the oil to the non-polymeric amine component is in the range of 0.1:1 to 1.5:1.

20. A fabric softener composition comprising:

A) a smectite clay;

B) a non-polymeric amine component according to the formula (I)

(I)

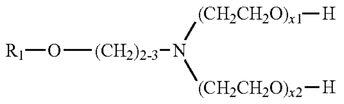

in which $R_1$ is an aliphatic branched or straight-chain hydrocarbyl group having a weight-average number of carbons in the range of 8-16 and the of sum x1 and x2 has a weight-average value in the range of 1.8-10;

C) a water-soluble metal halide or sulfate;

D) an oil selected from the group consisting of a mineral oil and a vegetable oil, and E) an anionic surfactant, wherein a weight ratio of the anionic surfactant to smectite clay is no more than 0.02:1.

21. The composition of claim 20, wherein the weight ratio of anionic surfactant to smectite clay is no more than 0.005:1.

22. The composition of claim 20, wherein the smectite clay is present in an amount in the range of 25-80 wt %, on a dry solids basis;

the non-polymeric amine component is present in an amount in the range of 5-50 wt %, on a dry solids basis;

the oil is present in an amount in the range of 2-25 wt %, on a dry solids basis; and a weight ratio of the water-soluble metal halide or sulfate to the smectite clay is in the range of 0.05:1 to 0.5:1.

* * * * *